(12) United States Patent
Krishnamoorthy et al.

(10) Patent No.: US 11,329,956 B2
(45) Date of Patent: May 10, 2022

(54) SCALABLE ENCRYPTION FRAMEWORK USING VIRTUALIZATION AND ADAPTIVE SAMPLING

(71) Applicant: Bank of America Corporation, Charlotte, NC (US)

(72) Inventors: Madhusudhanan Krishnamoorthy, Chennai (IN); Raghavendran Sukumaran, Chennai (IN); Vinothkumar Babu, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 117 days.

(21) Appl. No.: 16/941,032

(22) Filed: Jul. 28, 2020

(65) Prior Publication Data
US 2022/0038427 A1 Feb. 3, 2022

(51) Int. Cl.
*H04L 29/06* (2006.01)

(52) U.S. Cl.
CPC ...... *H04L 63/0263* (2013.01); *H04L 63/0254* (2013.01); *H04L 63/10* (2013.01); *H04L 63/1416* (2013.01); *H04L 63/1433* (2013.01); *H04L 63/20* (2013.01)

(58) Field of Classification Search
CPC . H04L 63/0263; H04L 63/0254; H04L 63/10; H04L 63/1416; H04L 63/20
USPC .......................................................... 726/23
See application file for complete search history.

(56) References Cited

U.S. PATENT DOCUMENTS

| | | | |
|---|---|---|---|
| 5,835,727 A | 11/1998 | Wong et al. | |
| 5,848,233 A | 12/1998 | Radia et al. | |
| 6,092,110 A | 7/2000 | Maria et al. | |
| 6,158,008 A | 12/2000 | Maria et al. | |
| 6,253,321 B1 | 6/2001 | Nikander et al. | |
| 6,600,744 B1 | 7/2003 | Carr et al. | |
| 10,645,099 B1 * | 5/2020 | Ciubotariu | H04L 63/145 |
| 10,868,818 B1 * | 12/2020 | Rathor | H04L 67/36 |
| 2006/0150143 A1 | 7/2006 | Andreev et al. | |
| 2006/0156274 A1 | 7/2006 | Andreev et al. | |
| 2006/0179148 A1 | 8/2006 | Sandin et al. | |
| 2006/0294431 A1 | 12/2006 | Bader et al. | |
| 2007/0256127 A1 * | 11/2007 | Kraemer | H04L 63/20 726/23 |
| 2007/0289008 A1 | 12/2007 | Andreev et al. | |

(Continued)

*Primary Examiner* — Teshome Hailu
(74) *Attorney, Agent, or Firm* — Moore & Van Allen PLLC; Anup Shrinivasan Iyer

(57) ABSTRACT

Systems, computer program products, and methods are described herein for scalable encryption framework using virtualization and adaptive sampling. The present invention is configured to receive metadata associated with one or more intrusion types from an intrusion data lake; initiate an adaptive instance sampling engine on the metadata associated with the one or more intrusion types to generate a sampled intrusion data lake; initiate one or more simulations of atomic intrusion on a firewall; generate one or more prioritized combination of the one or more sampled intrusion types; initiate one or more simulations of cumulative intrusion on the firewall using the one or more prioritized combination of the one or more sampled intrusion types; determine an atomic performance metric and a cumulative performance metric of the firewall; and generate a robustness report for the firewall.

20 Claims, 3 Drawing Sheets

(56) References Cited

U.S. PATENT DOCUMENTS

| | | | |
|---|---|---|---|
| 2008/0027891 A1* | 1/2008 | Repasi | G06F 21/577 |
| | | | 706/52 |
| 2008/0098473 A1 | 4/2008 | Liu et al. | |
| 2008/0183782 A1 | 7/2008 | Andreev et al. | |
| 2008/0201400 A1 | 8/2008 | Sasaki | |
| 2009/0007251 A1 | 1/2009 | Abzarian et al. | |
| 2009/0077609 A1 | 3/2009 | Bichot et al. | |
| 2009/0115204 A1* | 5/2009 | Rycroft | E05C 3/043 |
| | | | 292/341.17 |
| 2009/0204693 A1 | 8/2009 | Andreev et al. | |
| 2009/0249472 A1 | 10/2009 | Litvin et al. | |
| 2009/0287808 A1 | 11/2009 | Andreev et al. | |
| 2010/0088418 A1 | 4/2010 | Abzarian et al. | |
| 2016/0019390 A1* | 1/2016 | Akelbein | G06F 21/554 |
| | | | 726/23 |
| 2019/0116201 A1* | 4/2019 | Makowski | G06F 21/54 |
| 2021/0165879 A1* | 6/2021 | Duo | G06F 21/552 |

\* cited by examiner

SCALABLE ENCRYPTION FRAMEWORK USING VIRTUALIZATION AND ADAPTIVE SAMPLING

FIELD OF THE INVENTION

The present invention embraces a system for scalable encryption framework using virtualization and adaptive sampling.

BACKGROUND

A firewall is a software or a hardware device that inspects incoming and outgoing traffic on a network. Based on a predetermined set of policies and rules, or an access control list (ACL), the firewall filters and restricts all connections that do not abide by those rules. The main purpose of a firewall is to separate trusted networks from the external network or the internet. Firewall penetration testing is the process of locating, investigating and penetrating a certain firewall in order to reach the internal trusted network of a certain system. Mostly considered to be a key part in external network penetration testing, firewall testing is one of the most important types of network tests that can be conducted as firewalls represent the first line of defense against outside intrusions. When testing firewalls, it is not uncommon to test the robustness of the firewall using multiple types of intrusion scenarios, including, but not limited to, shift-left, domain generation algorithms, data exfiltration, and/or the like. Such intrusion scenarios typically involve testing the firewall with each intrusion type individually—as atomic intrusions—to determine the robustness of the firewall to that intrusion type. However, the robustness of the firewall, even to a specific intrusion type, may be vary depending on which combination of intrusion types—cumulative intrusion—is being used at each instance. Therefore, there is a need for a scalable encryption framework using virtualization and adaptive sampling.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for scalable encryption framework using virtualization and adaptive sampling is presented. The system comprising: at least one non-transitory storage device; and at least one processing device coupled to the at least one non-transitory storage device, wherein the at least one processing device is configured to: electronically receive metadata associated with one or more intrusion types from an intrusion data lake; initiate an adaptive instance sampling engine on the metadata associated with the one or more intrusion types to generate a sampled intrusion data lake, wherein the sampled intrusion data lake comprises one or more sampled intrusion types; initiate one or more simulations of atomic intrusion on a firewall, wherein initiating further comprises initiating the one or more simulations of the atomic intrusion using the one or more sampled intrusion types; generate one or more prioritized combination of the one or more sampled intrusion types; initiate one or more simulations of cumulative intrusion on the firewall, wherein initiating further comprises initiating the one or more simulations of cumulative intrusion using the one or more prioritized combination of the one or more sampled intrusion types; determine an atomic performance metric of the firewall for each of the one or more simulations of atomic intrusion; determine a cumulative performance metric of the firewall for each of the one or more simulations of cumulative intrusion on the firewall; and generate a robustness report for the firewall based on at least the atomic performance metric for each of the one or more simulations of atomic intrusion and the cumulative performance metric for each of the one or more simulations of cumulative intrusion on the firewall.

In some embodiments, the at least one processing device is further configured to: initiate the adaptive instance sampling engine on the metadata associated with the one or more intrusion types, wherein the one or more intrusion types are associated with one or more sampling distributions; and generate the one or more sampled intrusion types, wherein generating further comprises transforming the one or more sampling distributions associated with the one or more intrusion types to a predetermined sampling distribution.

In some embodiments, the at least one processing device is further configured to: initiate the one or more simulations of the atomic intrusion using the one or more sampled intrusion types, wherein each of the one or more simulations of the atomic intrusion comprises one or more instances of each of the one or more sampled intrusion types.

In some embodiments, the at least one processing device is further configured to: determine one or more variables associated with a first sampled intrusion type, wherein the first sampled intrusion type is associated with the one or more sampled intrusion types; determine a range of values for the one or more variables associated with the first sampled intrusion type; and initiate the one or more instances of a first sampled intrusion type by assigning a value from the range of values to the one or more variables associated with the first sampled intrusion type at each of the one or more instances.

In some embodiments, the at least one processing device is further configured to: generate the one or more prioritized combinations of the one or more sampled intrusion types, wherein generating further comprises assigning a range of priorities to the one or more sampled intrusion types in each of the one or more prioritized combinations.

In some embodiments, the at least one processing device is further configured to: assigning the range of priorities to the one or more sampled intrusion types in each of the one or more prioritized combinations, wherein assigning further comprises assigning a high priority to at least one of the one or more sampled intrusion types in each of the one or more prioritized combinations and a low priority to at least one of the one or more sampled intrusion types in each of the one or more prioritized combinations.

In some embodiments, a number of occurrences of the at least one of the one or more sampled intrusion types in each of the one or more prioritized combinations with the high priority is more than a number of occurrences of the at least one of the one or more sampled intrusion types in each of the one or more prioritized combinations with the low priority.

In some embodiments, the at least one processing device is further configured to: determine a first set of changes to be implemented on the firewall to improve the atomic performance metric for each of the one or more simulations of atomic intrusion on the firewall; and automatically implement the first set of changes on the firewall.

In some embodiments, the at least one processing device is further configured to: determine a second set of changes to be implemented on the firewall to improve the cumulative performance metric for each of the one or more simulations of cumulative intrusion on the firewall; and automatically implement the second set of changes on the firewall.

In some embodiments, the at least one processing device is further configured to: automatically implement the first set of changes on the firewall to generate a modified firewall; initiate the one or more simulations of cumulative intrusion on the modified firewall; determine a modified cumulative performance metric of the modified firewall for each of the one or more simulations of cumulative intrusion on the modified firewall; determine a third set of changes to be implemented on the modified firewall to improve the modified cumulative performance metric for each of the one or more simulations of cumulative intrusion on the modified firewall.

In another aspect, a computer program product for scalable encryption framework using virtualization and adaptive sampling is presented. The computer program product comprising a non-transitory computer-readable medium comprising code causing a first apparatus to: electronically receive metadata associated with one or more intrusion types from an intrusion data lake; initiate an adaptive instance sampling engine on the metadata associated with the one or more intrusion types to generate a sampled intrusion data lake, wherein the sampled intrusion data lake comprises one or more sampled intrusion types; initiate one or more simulations of atomic intrusion on a firewall, wherein initiating further comprises initiating the one or more simulations of the atomic intrusion using the one or more sampled intrusion types; generate one or more prioritized combination of the one or more sampled intrusion types; initiate one or more simulations of cumulative intrusion on the firewall, wherein initiating further comprises initiating the one or more simulations of cumulative intrusion using the one or more prioritized combination of the one or more sampled intrusion types; determine an atomic performance metric of the firewall for each of the one or more simulations of atomic intrusion; determine a cumulative performance metric of the firewall for each of the one or more simulations of cumulative intrusion on the firewall; and generate a robustness report for the firewall based on at least the atomic performance metric for each of the one or more simulations of atomic intrusion and the cumulative performance metric for each of the one or more simulations of cumulative intrusion on the firewall.

In yet another aspect, a method for scalable encryption framework using virtualization and adaptive sampling is presented. The method comprising: electronically receiving metadata associated with one or more intrusion types from an intrusion data lake; initiating an adaptive instance sampling engine on the metadata associated with the one or more intrusion types to generate a sampled intrusion data lake, wherein the sampled intrusion data lake comprises one or more sampled intrusion types; initiating one or more simulations of atomic intrusion on a firewall, wherein initiating further comprises initiating the one or more simulations of the atomic intrusion using the one or more sampled intrusion types; generating one or more prioritized combination of the one or more sampled intrusion types; initiating one or more simulations of cumulative intrusion on the firewall, wherein initiating further comprises initiating the one or more simulations of cumulative intrusion using the one or more prioritized combination of the one or more sampled intrusion types; determining an atomic performance metric of the firewall for each of the one or more simulations of atomic intrusion; determining a cumulative performance metric of the firewall for each of the one or more simulations of cumulative intrusion on the firewall; and generating a robustness report for the firewall based on at least the atomic performance metric for each of the one or more simulations of atomic intrusion and the cumulative performance metric for each of the one or more simulations of cumulative intrusion on the firewall.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
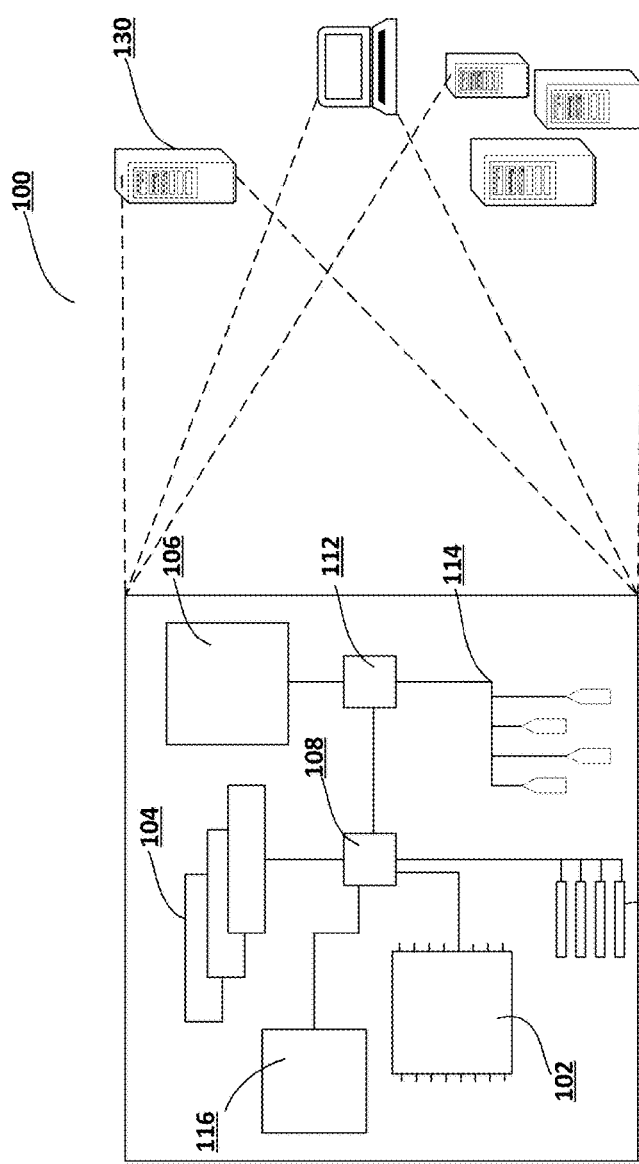
Figure 1:
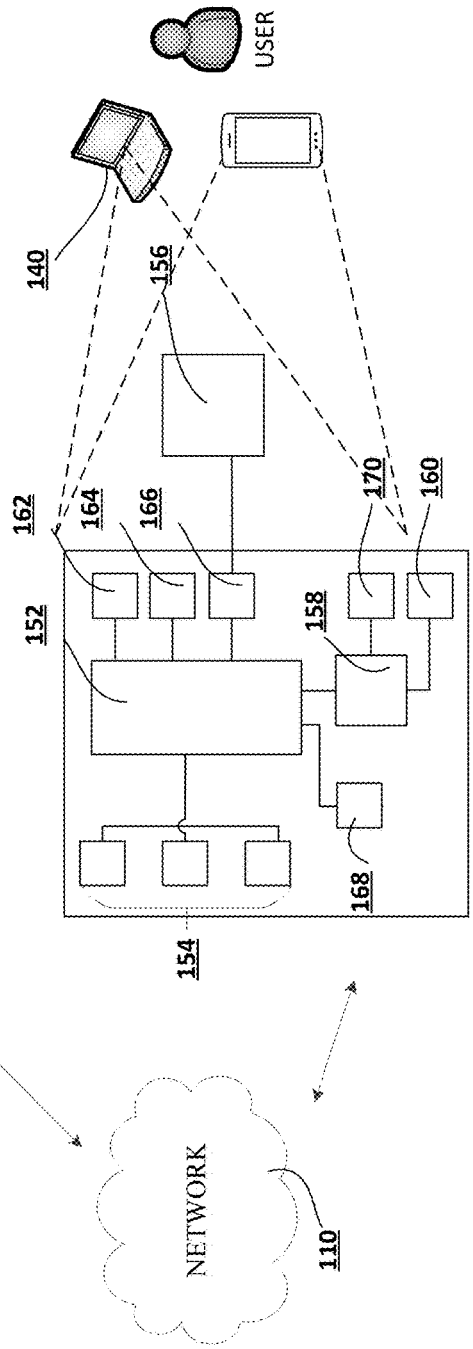
Figure 2:
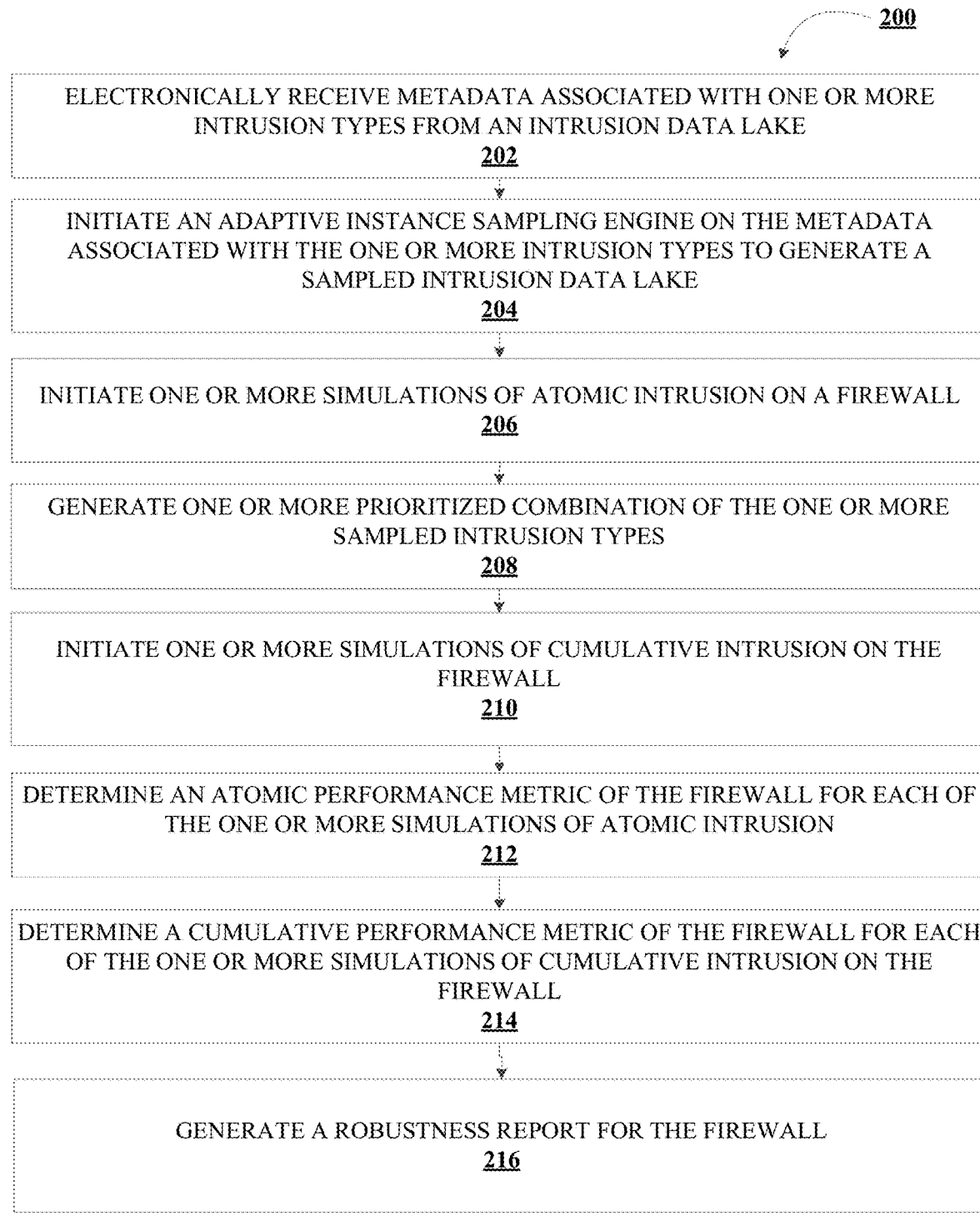
Figure 3:
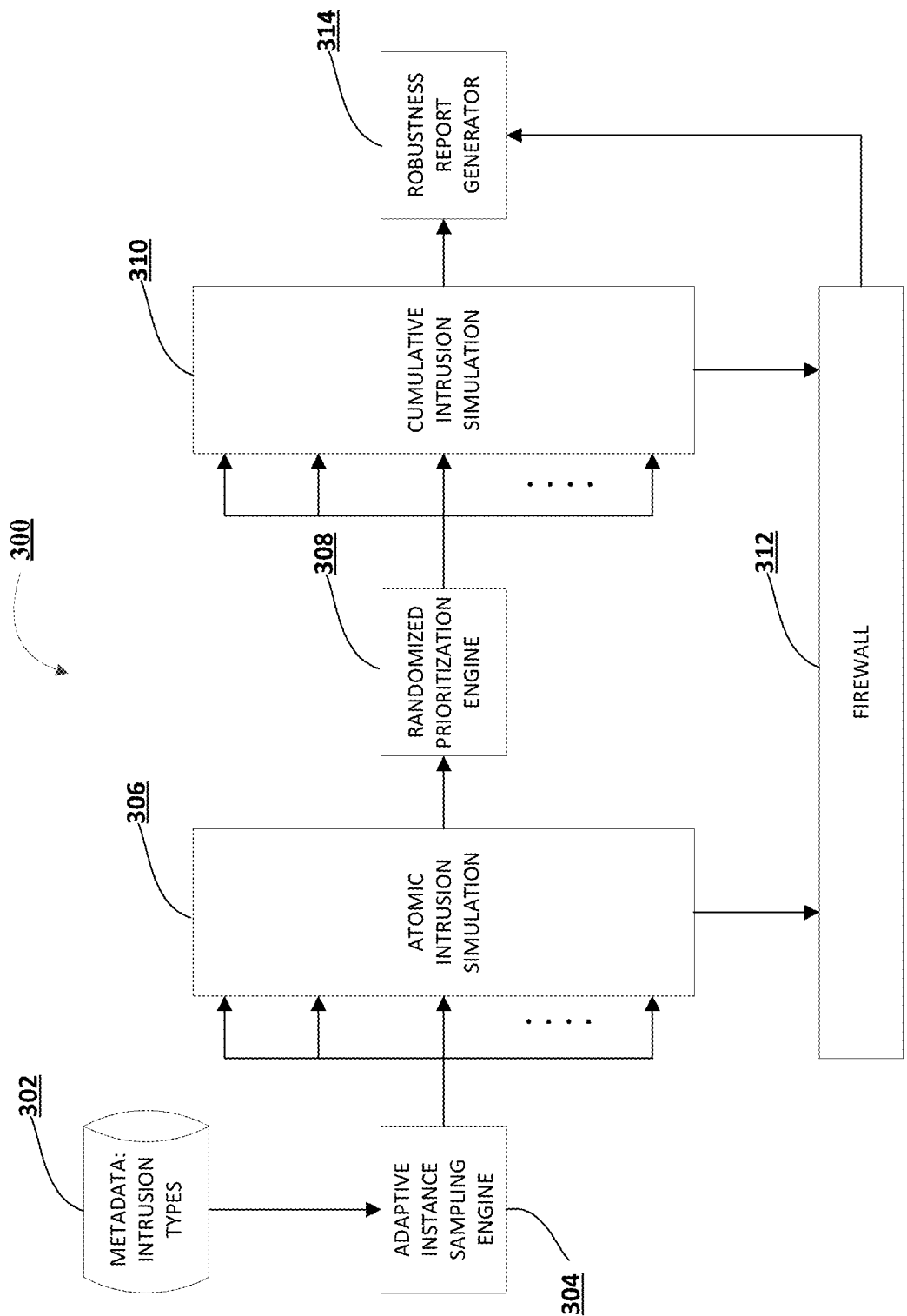

Having thus described embodiments of the invention in general terms, reference will now be made the accompanying drawings, wherein:

FIG. 1 illustrates technical components of a system for scalable encryption framework using virtualization and adaptive sampling, in accordance with an embodiment of the invention;

FIG. 2 illustrates a process flow for scalable encryption framework using virtualization and adaptive sampling, in accordance with an embodiment of the invention; and FIG. 3 illustrates a flowchart for scalable encryption framework using virtualization and adaptive sampling, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

FIG. 1 presents an exemplary block diagram of the system environment for scalable encryption framework using virtualization and adaptive sampling 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute resource transfers using one or more applications stored thereon. The one or more applications may be configured to communicate with the system 130, execute a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

A firewall is a software or a hardware device that inspects incoming and outgoing traffic on a network. Based on a predetermined set of policies and rules, or an access control list (ACL), the firewall filters and restricts all connections that do not abide by those rules. The main purpose of a firewall is to separate trusted networks from the external network or the internet. Firewall penetration testing is the process of locating, investigating and penetrating a certain firewall in order to reach the internal trusted network of a certain system. Mostly considered to be a key part in external network penetration testing, firewall testing is one of the most important types of network tests that can be conducted as firewalls represent the first line of defense against outside intrusions. When testing firewalls, it is not uncommon to test the robustness of the firewall using multiple types of intrusion scenarios, including, but not limited to, shift-left, domain generation algorithms, data exfiltration, and/or the like. Such intrusion scenarios typically involve testing the firewall with each intrusion type individually—as atomic intrusions—to determine the robustness of the firewall to that intrusion type. However, the robustness of the firewall, even to a specific intrusion type, may be vary depending on which combination of intrusion types—cumulative intrusion—is being used at each instance. The present invention provides the functional benefit of implementing a scalable encryption framework using virtualization and adaptive sampling to test, not only firewalls, but also any network or infrastructure intrusions.

FIG. 2 illustrates a process flow for scalable encryption framework using virtualization and adaptive sampling 200, in accordance with an embodiment of the invention. As shown in block 202, the process flow includes electronically receiving metadata associated with one or more intrusion types from an intrusion data lake. In some embodiments, the metadata associated with the one or more intrusion types may include descriptive information associated with the specific intrusion type that can be used for discovery and identification. In some other embodiments, the metadata associated with the one or more intrusion types may include structural metadata associated with the specific intrusion type indicating how the intrusion type is put together, order of testing steps, resources used to execute the intrusion test, and/or the like. In still other embodiments, the metadata associated with the one or more intrusion types may include administrative metadata associated with the specific intrusion type to help manage the intrusion type, such as resource type, permissions, and when and how it was created. In some embodiments, an intrusion data lake may be a repository where the metadata associated with the one or more intrusion types are stored in their original format and used for tasks such as reporting, virtualization, advanced analytics, and machine learning.

Next, as shown in block 204, the process flow includes initiating an adaptive instance sampling engine on the metadata associated with the one or more intrusion types to generate a sampled intrusion data lake. In some embodiments, the one or more intrusion types may be associated with one or more sampling distributions (e.g., probability distributions). By initiating the adaptive instance sampling engine on the metadata associated with the one or more intrusion types, the system may be configured to generate the one or more sampled intrusion types. To achieve this, the system may be configured to transform the one or more sampling distributions associated with the one or more intrusion types to a predetermined sampling distribution. In this regard, the system may be configured to implement upsampling or downsampling techniques to transform the distribution of intrusion types, such that each intrusion type has the same predetermined sampling distribution, such as a Normal distribution. In response to generating the one or more sampled intrusion types, the system may be configured to store the one or more sampled intrusion types in the sampled intrusion data lake. In some embodiments, the sampled intrusion data lake stores an equal distribution of each of the one or more intrusion types such that if a random number of intrusion types are selected from the sampled intrusion data lake, each intrusion type will be equally represented in the selected sample.

Next, as shown in block 206, the process flow includes initiating one or more simulations of atomic intrusion on a firewall. In some embodiments, an atomic intrusion may refer to one or more instances of intrusion on the firewall of a specific intrusion type. During firewall testing, entities implement a sequence of atomic attacks on the firewall, with each atomic intrusion involving an intrusion type. The firewall is then analyzed based on its response to each atomic intrusion to determine its robustness. In one aspect, the system may be configured to initiate the one or more simulations of the atomic intrusion using the one or more sampled intrusion types ensuring that each intrusion type is represented equally when testing the firewall. In some embodiments, each of the one or more simulations of the atomic intrusion comprises one or more instances of each of the one or more sampled intrusion types. In one aspect, each intrusion type may comprise of a set of conditions of variables under which the firewall is tested. These variables can take on different values capable of being independent, dependent and/or controlled. To effectively test the robustness of the firewall, the variables associated with each atomic intrusion types must be varied iteratively in small incremental/decremental changes. To achieve this, the system may be configured to, at each instance, initiate an atomic intrusion with a sampled intrusion type with specific values within a range of values. In the subsequent instance/iteration, the system may be configured to change the value of the variables (still within the range of values) and initiate an atomic intrusion of the same sampled intrusion type. In this way, the system may be configured to initiate the atomic intrusion of the same sampled intrusion type by varying the values of the variables until all the values within the range of values are used.

In some embodiments, the system may be configured to determine one or more variables associated with a first sampled intrusion type. Here, the first sampled intrusion type is associated with the one or more sampled intrusion types. For each of the one or more variables associated with the first sampled intrusion type, the system may be configured to determine a range of values. Once the range of values of determined, the system may be configured to initiate the one or more instances of a first sampled intrusion type by assigning a value from the range of values to the one or more variables associated with the first sampled intrusion type at each of the one or more instances.

Next, as shown in block 208, the process flow includes generating one or more prioritized combination of the one or more sampled intrusion types. In some embodiments, the system may be configured to generate the one or more prioritized combinations of the one or more sampled intrusion types by assigning a range of priorities to the one or more sampled intrusion types in each of the one or more prioritized combinations. In one aspect, the system may be configured to assign a high priority to at least one of the one or more sampled intrusion types in each of the one or more prioritized combinations and a low priority to at least one of the one or more sampled intrusion types in each of the one or more prioritized combinations. In some embodiments, a number of occurrences of the at least one of the one or more sampled intrusion types in each of the one or more prioritized combinations with the high priority is more than a number of occurrences of the at least one of the one or more sampled intrusion types in each of the one or more prioritized combinations with the low priority.

Next, as shown in block 210, the process flow includes initiating one or more simulations of cumulative intrusion on the firewall. In this regard, the system may be configured to initiate the one or more simulations of cumulative intrusion using the one or more prioritized combination of the one or more sampled intrusion types.

Next, as shown in block 212, the process flow includes determining an atomic performance metric of the firewall for each of the one or more simulations of atomic intrusion. In some embodiments, an atomic performance metric may refer to one or more network security metric used by entities across all industries to establish a reference level in assessing the quality and efficacy of a firewall to atomic intrusions. In one aspect, the atomic performance metric may be a weighted combination of one or more performance metrics measured based on the firewall's response to the one or more instances of the one or more sampled intrusion types. Examples of the one or more performance metrics may include, but is not limited to, intrusion prevention metrics—number of successful blocks of malicious traffic based on a comparison of packet/session contents against signatures/filters/protocols decoders without false positives, evasion metrics—accurately detecting and blocking known intrusion types when subjected to varied variable values and evasion technologies, application control—accurately executing outbound and inbound policies consisting of many rules, objects, and applications and identifying the correct application, and taking the appropriate control action, firewall policy enforcement—correctly enforcing firewall rules that permit or deny access from one network resource to another based on identifying criteria such as source, destination, and service, stability and reliability—maintaining security effectiveness while passing malicious traffic under normal or heavy conditions, and/or the like. In some embodiments, each performance metric may be weighted (positively or negatively) based on the nature of the metric itself and aggregated to form the atomic performance metric used to evaluate the robustness of the firewall against atomic intrusions.

In some embodiments, the system may be configured to determine a first set of changes to be implemented on the firewall to improve the atomic performance metric for each of the one or more simulations of atomic intrusion on the firewall. In some embodiments, the first set of changes may include identifying and removing one or more vulnerable communication ports, fixing firewall policy anomalies, resolving authentication requirements, deactivating unauthorized background applications being executed without user permission or knowledge, identifying and flagging incorrectly configured digital certificates, isolating software or hardware with known vulnerabilities, increasing frequency of review of third party access, decreasing a frequency of access to critical enterprise systems by third parties, and/or the like. In response to determining the first set of changes, the system may be configured to automatically implement the first set of changes on the firewall.

Next, as shown in block 214, the process flow includes determining a cumulative performance metric of the firewall for each of the one or more simulations of cumulative intrusion on the firewall. In some embodiments, the cumulative performance metric of the firewall may be a weighted combination of the one or more performance metrics described herein, measured based on the firewall's response to the one or more simulations of cumulative intrusions. In some embodiments, the system may be configured to determine a second set of changes to be implemented on the firewall to improve the cumulative performance metric for each of the one or more simulations of cumulative intrusion on the firewall. In response to determining the second set of changes, the system may be configured to automatically implement the second set of changes on the firewall. In some embodiments, the second set of changes may be same or similar to the first set of changes. In some other embodiments, the second set of changes may be a different set of changes than that of the first set of changes. In this regard, the second set of changes may be specific to improving the cumulative performance metric.

In some embodiments, the system may be configured to automatically implement the first set of changes on the firewall to generate a modified firewall. In response, the system may be configured to initiate the one or more simulations of cumulative intrusion on the modified firewall. In response, the system may be configured to determine a modified cumulative performance metric of the modified firewall for each of the one or more simulations of cumulative intrusion on the modified firewall. In response, the system may be configured to determine a third set of changes to be implemented on the modified firewall to improve the modified cumulative performance metric for each of the one or more simulations of cumulative intrusion on the modified firewall. In some embodiments, the third set of changes may be same or similar to the first set of changes and/or the second set of changes. In some other embodiments, the third set of changes may be a different set of changes than that of the second set of changes and/or the first set of changes.

Next, as shown in block 216, the process flow includes generating a robustness report for the firewall. In some embodiments, the system may be configured to generate the robustness report for the firewall based on at least the atomic performance metric for each of the one or more simulations of atomic intrusion and the cumulative performance metric for each of the one or more simulations of cumulative intrusion on the firewall.

FIG. 3 illustrates a flowchart for scalable encryption framework using virtualization and adaptive sampling 300, in accordance with an embodiment of the invention. As shown in FIG. 3, the metadata associated with the intrusion types is stored in the intrusion data lake 302. At step 304, the system retrieves the metadata associated with the intrusion types and initiates an adaptive instance sampling engine 304 on the metadata to generate one or more sampled intrusion types. These sampled intrusion types are then used in simulating atomic intrusion 306 on the firewall 312. At step 308, the system initiates a randomized prioritization engine on the sampled intrusion types to generate one or more prioritized combinations of the one or more sampled intrusion types. At step 310, the system initiates a simulation of the cumulative intrusion using the one or more prioritized combinations of the one or more sampled intrusion types on the firewall 312. At step 314, the system initiates a robust report generator to generate a robustness report based on the performance of the firewall 312.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for scalable encryption framework using virtualization and adaptive sampling, the system comprising:
    at least one non-transitory storage device; and
    at least one processing device coupled to the at least one non-transitory storage device, wherein the at least one processing device is configured to:
    electronically receive metadata associated with one or more intrusion types from an intrusion data lake;
    initiate an adaptive instance sampling engine on the metadata associated with the one or more intrusion types to generate a sampled intrusion data lake, wherein the sampled intrusion data lake comprises one or more sampled intrusion types;
    initiate one or more simulations of atomic intrusion on a firewall, wherein initiating further comprises initiating the one or more simulations of the atomic intrusion using the one or more sampled intrusion types;
    generate one or more prioritized combination of the one or more sampled intrusion types;
    initiate one or more simulations of cumulative intrusion on the firewall, wherein initiating further comprises initiating the one or more simulations of cumulative intrusion using the one or more prioritized combination of the one or more sampled intrusion types;
    determine an atomic performance metric of the firewall for each of the one or more simulations of atomic intrusion;
    determine a cumulative performance metric of the firewall for each of the one or more simulations of cumulative intrusion on the firewall; and
    generate a robustness report for the firewall based on at least the atomic performance metric for each of the one or more simulations of atomic intrusion and the cumulative performance metric for each of the one or more simulations of cumulative intrusion on the firewall.

2. The system of claim 1, wherein the at least one processing device is further configured to:
    initiate the adaptive instance sampling engine on the metadata associated with the one or more intrusion types, wherein the one or more intrusion types are associated with one or more sampling distributions; and
    generate the one or more sampled intrusion types, wherein generating further comprises transforming the one or more sampling distributions associated with the one or more intrusion types to a predetermined sampling distribution.

3. The system of claim 1, wherein the at least one processing device is further configured to:
    initiate the one or more simulations of the atomic intrusion using the one or more sampled intrusion types, wherein each of the one or more simulations of the atomic intrusion comprises one or more instances of each of the one or more sampled intrusion types.

4. The system of claim 3, wherein the at least one processing device is further configured to:
    determine one or more variables associated with a first sampled intrusion type, wherein the first sampled intrusion type is associated with the one or more sampled intrusion types;
    determine a range of values for the one or more variables associated with the first sampled intrusion type; and
    initiate the one or more instances of a first sampled intrusion type by assigning a value from the range of values to the one or more variables associated with the first sampled intrusion type at each of the one or more instances.

5. The system of claim 1, wherein the at least one processing device is further configured to:
    generate the one or more prioritized combinations of the one or more sampled intrusion types, wherein generating further comprises assigning a range of priorities to the one or more sampled intrusion types in each of the one or more prioritized combinations.

6. The system of claim 5, wherein the at least one processing device is further configured to:
    assigning the range of priorities to the one or more sampled intrusion types in each of the one or more prioritized combinations, wherein assigning further comprises assigning a high priority to at least one of the one or more sampled intrusion types in each of the one or more prioritized combinations and a low priority to at least one of the one or more sampled intrusion types in each of the one or more prioritized combinations.

7. The system of claim 6, wherein a number of occurrences of the at least one of the one or more sampled intrusion types in each of the one or more prioritized combinations with the high priority is more than a number of occurrences of the at least one of the one or more sampled intrusion types in each of the one or more prioritized combinations with the low priority.

8. The system of claim 1, wherein the at least one processing device is further configured to:
    determine a first set of changes to be implemented on the firewall to improve the atomic performance metric for each of the one or more simulations of atomic intrusion on the firewall; and
    automatically implement the first set of changes on the firewall.

9. The system of claim 8, wherein the at least one processing device is further configured to:
    determine a second set of changes to be implemented on the firewall to improve the cumulative performance metric for each of the one or more simulations of cumulative intrusion on the firewall; and automatically implement the second set of changes on the firewall.

10. The system of claim 9, wherein the at least one processing device is further configured to:
automatically implement the first set of changes on the firewall to generate a modified firewall;
initiate the one or more simulations of cumulative intrusion on the modified firewall;
determine a modified cumulative performance metric of the modified firewall for each of the one or more simulations of cumulative intrusion on the modified firewall;
determine a third set of changes to be implemented on the modified firewall to improve the modified cumulative performance metric for each of the one or more simulations of cumulative intrusion on the modified firewall.

11. A computer program product for scalable encryption framework using virtualization and adaptive sampling, the computer program product comprising a non-transitory computer-readable medium comprising code causing a first apparatus to:
electronically receive metadata associated with one or more intrusion types from an intrusion data lake;
initiate an adaptive instance sampling engine on the metadata associated with the one or more intrusion types to generate a sampled intrusion data lake, wherein the sampled intrusion data lake comprises one or more sampled intrusion types;
initiate one or more simulations of atomic intrusion on a firewall, wherein initiating further comprises initiating the one or more simulations of the atomic intrusion using the one or more sampled intrusion types;
generate one or more prioritized combination of the one or more sampled intrusion types;
initiate one or more simulations of cumulative intrusion on the firewall, wherein initiating further comprises initiating the one or more simulations of cumulative intrusion using the one or more prioritized combination of the one or more sampled intrusion types;
determine an atomic performance metric of the firewall for each of the one or more simulations of atomic intrusion;
determine a cumulative performance metric of the firewall for each of the one or more simulations of cumulative intrusion on the firewall; and
generate a robustness report for the firewall based on at least the atomic performance metric for each of the one or more simulations of atomic intrusion and the cumulative performance metric for each of the one or more simulations of cumulative intrusion on the firewall.

12. The computer program product of claim 11, wherein the first apparatus is further configured to:
initiate the adaptive instance sampling engine on the metadata associated with the one or more intrusion types, wherein the one or more intrusion types are associated with one or more sampling distributions; and
generate the one or more sampled intrusion types, wherein generating further comprises transforming the one or more sampling distributions associated with the one or more intrusion types to a predetermined sampling distribution.

13. The computer program product of claim 12, wherein the first apparatus is further configured to:
initiate the one or more simulations of the atomic intrusion using the one or more sampled intrusion types, wherein each of the one or more simulations of the atomic intrusion comprises one or more instances of each of the one or more sampled intrusion types.

14. The computer program product of claim 13, wherein the first apparatus is further configured to:
determine one or more variables associated with a first sampled intrusion type, wherein the first sampled intrusion type is associated with the one or more sampled intrusion types;
determine a range of values for the one or more variables associated with the first sampled intrusion type; and
initiate the one or more instances of a first sampled intrusion type by assigning a value from the range of values to the one or more variables associated with the first sampled intrusion type at each of the one or more instances.

15. The computer program product of claim 14, wherein the first apparatus is further configured to:
generate the one or more prioritized combinations of the one or more sampled intrusion types, wherein generating further comprises assigning a range of priorities to the one or more sampled intrusion types in each of the one or more prioritized combinations.

16. The computer program product of claim 15, wherein the first apparatus is further configured to:
assigning the range of priorities to the one or more sampled intrusion types in each of the one or more prioritized combinations, wherein assigning further comprises assigning a high priority to at least one of the one or more sampled intrusion types in each of the one or more prioritized combinations and a low priority to at least one of the one or more sampled intrusion types in each of the one or more prioritized combinations.

17. The computer program product of claim 16, wherein a number of occurrences of the at least one of the one or more sampled intrusion types in each of the one or more prioritized combinations with the high priority is more than a number of occurrences of the at least one of the one or more sampled intrusion types in each of the one or more prioritized combinations with the low priority.

18. A method for scalable encryption framework using virtualization and adaptive sampling, the method comprising:
electronically receiving metadata associated with one or more intrusion types from an intrusion data lake;
initiating an adaptive instance sampling engine on the metadata associated with the one or more intrusion types to generate a sampled intrusion data lake, wherein the sampled intrusion data lake comprises one or more sampled intrusion types;
initiating one or more simulations of atomic intrusion on a firewall, wherein initiating further comprises initiating the one or more simulations of the atomic intrusion using the one or more sampled intrusion types;
generating one or more prioritized combination of the one or more sampled intrusion types;
initiating one or more simulations of cumulative intrusion on the firewall, wherein initiating further comprises initiating the one or more simulations of cumulative intrusion using the one or more prioritized combination of the one or more sampled intrusion types;
determining an atomic performance metric of the firewall for each of the one or more simulations of atomic intrusion;

determining a cumulative performance metric of the firewall for each of the one or more simulations of cumulative intrusion on the firewall; and generating a robustness report for the firewall based on at least the atomic performance metric for each of the one or more simulations of atomic intrusion and the cumulative performance metric for each of the one or more simulations of cumulative intrusion on the firewall.

19. The method of claim 18, wherein the method further comprises:

initiating the adaptive instance sampling engine on the metadata associated with the one or more intrusion types, wherein the one or more intrusion types are associated with one or more sampling distributions; and generating the one or more sampled intrusion types, wherein generating further comprises transforming the one or more sampling distributions associated with the one or more intrusion types to a predetermined sampling distribution.

20. The method of claim 19, wherein the method further comprises:

initiating the one or more simulations of the atomic intrusion using the one or more sampled intrusion types, wherein each of the one or more simulations of the atomic intrusion comprises one or more instances of each of the one or more sampled intrusion types.

* * * * *